United States Patent
Rao et al.

(10) Patent No.: US 9,690,899 B2
(45) Date of Patent: Jun. 27, 2017

(54) PRIORITIZED PATH TRACING IN STATISTICAL TIMING ANALYSIS OF INTEGRATED CIRCUITS

(71) Applicant: International Business Machines Corporation, Armonk, NY (US)

(72) Inventors: Vasant Rao, Fishkill, NY (US); Debjit Sinha, Wappingers Falls, NY (US); Chandramouli Visweswariah, Croton-on-Hudson, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/825,533

(22) Filed: Aug. 13, 2015

(65) Prior Publication Data
US 2017/0046469 A1    Feb. 16, 2017

(51) Int. Cl.
G06F 17/50 (2006.01)

(52) U.S. Cl.
CPC ...... *G06F 17/5081* (2013.01); *G06F 17/5077* (2013.01); *G06F 17/505* (2013.01); *G06F 17/5031* (2013.01); *G06F 2217/84* (2013.01)

(58) Field of Classification Search
CPC ............. G06F 17/5031; G06F 17/5081; G06F 17/505; G06F 2217/84
USPC ............................ 716/108, 113, 136; 703/16
See application file for complete search history.

(56) References Cited

U.S. PATENT DOCUMENTS

| | | | |
|---|---|---|---|
| 5,553,002 A * | 9/1996 | Dangelo | G01R 31/31704 714/E11.167 |
| 5,636,372 A | 6/1997 | Hathaway et al. | |
| 7,886,247 B2 | 2/2011 | Fatemi et al. | |
| 8,239,798 B1 * | 8/2012 | Goyal | G06F 17/5031 716/113 |
| 9,275,178 B1 * | 3/2016 | Fung | G06F 17/5031 |
| 2006/0048085 A1 * | 3/2006 | Tyler | G06F 17/5031 716/113 |

(Continued)

OTHER PUBLICATIONS

Chang et al., "Statistical Timing Analysis Considering Spatial Correlations Using a Single Pert-Like Traversal," 2003, pp. 621-625, IEEE International Conference on Computer-Aided Design.

(Continued)

*Primary Examiner* — Phallaka Kik
(74) *Attorney, Agent, or Firm* — Steven J. Meyers; Hoffman Warnick LLC (57) ABSTRACT

Methods of the present disclosure can include methods for prioritized path tracing in a statistical timing analysis of integrated circuits. Methods of the present disclosure can include: determining a required arrival time for a merge point in a statistical timing graph, the merge point having a plurality of associated input edges; calculating a plurality of edge slack distributions for each of the plurality of input edges and the required arrival time at the merge point; projecting a representative edge slack from each of the plurality of edge slack distributions; identifying a most critical input edge based on the plurality of representative edge slacks; generating a prioritized listing of input edges from lowest-value representative edge slack to highest-value representative edge slack; and tracing a next-most critical input edge of the prioritized listing, subsequent to tracing a path from the most critical edge to a source point.

17 Claims, 5 Drawing Sheets

(56) References Cited

U.S. PATENT DOCUMENTS

| | | | | |
|---|---|---|---|---|
| 2007/0143722 A1* | 6/2007 | Venkateswaran | ... | G06F 17/5031 716/108 |
| 2008/0072198 A1* | 3/2008 | Celik | .................. | G06F 17/5031 716/108 |
| 2008/0163147 A1* | 7/2008 | Gregerson | .......... | G06F 17/5031 716/108 |
| 2009/0055780 A1* | 2/2009 | Acar | ................... | G06F 17/5031 716/132 |
| 2010/0192117 A1* | 7/2010 | Zhu | ..................... | G06F 17/5031 716/113 |
| 2012/0311514 A1* | 12/2012 | Lavin | .................... | G06F 17/504 716/108 |
| 2012/0311515 A1* | 12/2012 | Zolotov | .................... | G06F 8/20 716/108 |
| 2016/0012173 A1* | 1/2016 | Hathaway | ........... | G06F 17/5081 716/113 |

OTHER PUBLICATIONS

Visweswariah et al., "First-Order Incremental Block-Based Statistical Timing Analysis," 2004, pp. 331-336, Design Automation Conference.

Zolotov et al., "Statistical Path Selection for At-Speed Test,", IEEE, 2008, pp. 624-631.

* cited by examiner

PRIORITIZED PATH TRACING IN STATISTICAL TIMING ANALYSIS OF INTEGRATED CIRCUITS

BACKGROUND

Technical Field

The present disclosure relates generally to timing analyses of circuit designs, and more specifically, to methods which provide prioritized path tracing in a statistical timing analysis based on values projected from a statistical edge slack for each input edge to a given merge point in a statistical timing graph.

Related Art

Static timing analysis (STA) is used to compute the expected timing of an integrated circuit (IC) to identify problem areas of an integrated circuit during the design phase and in advance of actual fabrication. Timing runs in STA simulate the timing of the IC to determine whether or not the IC meets various timing constraints and, therefore, is likely to operate properly if fabricated in accordance with the tested design.

Deterministic static timing analysis (DSTA) propagates timing value entries, such as arrival times (ATs), required arrival times (RATs), and slews, along with any other timing related quantities (guard times, adjusts, asserts, slacks, etc.), in a timing graph as single valued deterministic data. DSTA covers a single corner of a space of process variations with each individual timing run. A corner represents a particular combination of input values for a parameter that may include temperature of the circuit, input voltage, and other manufacturing parameters of an IC. To evaluate the effect that a given parameter will have on timing, multiple DSTA timing runs must be executed with parameters that affect timing set at several maximum and minimum corners, such as high and low temperatures, high and low voltages, and various processing conditions. For example, DSTA timing runs may compare a worst case corner characterized by a combination of high input voltage, a high operating temperature, and the worst manufacturing parameters with a best case corner characterized by a combination of a low input voltage, a low operating temperature, and the best manufacturing parameters.

Timing values are computed for a timing graph at each node based upon the ATs, which define the time (or the time distribution) at which a given signal arrives at a timing point, and the RATs, which defines the time (or the time distribution) at which the signal is required to get to the timing point, in order to meet the timing requirements. These ATs and RATs are used to compute timing metrics in the form of slacks at nodes (RAT minus AT for late signals and AT minus RAT for early signals). A negative value for either a late mode slack or an early mode slack indicates a timing constraint violation. As a check of the performance of the integrated circuit design, DSTA timing runs may examine many or all of the corners and the IC design may be iteratively adjusted until all of the corners pass the timing tests. These results reflect the extreme performance bounds of the integrated circuit and may require numerous timing runs to fully explore the space of process variations. Even then, the results may be overly pessimistic and misleading for optimization tools.

Statistical static timing analysis (SSTA) propagates timing value entries as random variables with known probability distribution functions, or their approximation, instead of as scalar deterministic data (e.g., under DSTA). SSTA may calculate a result, for example, a delay and/or output slew, for the propagated statistical distribution functions of input slew and (output) load. A single timing run using block-based SSTA predicts the performance of the integrated circuit over the entire space of process variations. In contrast, a single timing run using DSTA merely predicts a single corner of the space of process variations. Consequently, in order to close or meet timing requirements, a single SSTA timing run may replace multiple DSTA timing runs. For example, assuming the existence of N parameters (i.e., variables or sources of variation) and two corners per parameter, $2^N$ corners would have to be individually analyzed by discrete DSTA timing runs to match the effectiveness of a single SSTA run. Hence, SSTA is far more computationally efficient than DSTA.

A test run that passes in a single process corner under a DSTA timing run may actually fail without detection in one or more other performance-limiting corners in the process space, which a SSTA timing run would reveal. SSTA also reduces pessimism because of the statistical techniques inherent in this approach. For example, the propagation of known independently random terms in SSTA allows for taking the square root of the sum of the squares of random quantities (RSSing) between each propagation state, rather than straight summation as in DSTA. Finally, information regarding the probability of particular failure modes may be obtained in SSTA, as opposed to DSTA that merely indicates a binary pass/fail condition. SSTA may allow for very low probability fails to be ignored while also allowing for a more aggressive clipping of the statistical tails when used with at-speed tests.

A challenge with the conventional deterministic approach is that, when tracing backward from an end point of a timing graph to one of several possible source points, a testing regime can include modeling and selecting one of multiple input edges leading into the merge point. A final node in a timing graph can refer to a node at which a signal has completely propagated through an IC, a node where a timing check or test (i.e., Setup/Hold/Pulse-width) is performed, and/or any other node which is manually or automatically defined as being an end point. In DSTA, path tracing from a merge point can simply involve determining an input edge with the lowest-value deterministic-slack and tracing back from this particular input edge before others. However, in SSTA, each input edge is variability dependent. In other words, each input edge can be modeled as a statistical distribution. For example, the fact that an output load is fabrication process, voltage, temperature (PVT) dependent indicates that loads can be modeled in a statistical fashion. Consequently, attempting to prioritize each input edge based on statistically modeled parameters can introduce a new dimension of complexity in statistical macro-modeling and analysis of a timing graph.

BRIEF SUMMARY

A first aspect of the present disclosure provides a computer-implemented method for prioritized path tracing in a statistical timing analysis of an integrated circuit, the method including: determining a required arrival time for a merge point in a statistical timing graph, the merge point having a plurality of associated input edges; calculating a plurality of edge slack distributions for each of the plurality of input edges, each of the plurality of edge slack distributions being a difference between a block-based propagated statistical arrival time through a corresponding one of the plurality of input edges, and the required arrival time at the merge point; projecting a representative edge slack from each of the plurality of edge slack distributions; identifying a most critical input edge based on the plurality of representative edge slacks; generating a prioritized listing of input edges from lowest-value representative edge slack to highest-value representative edge slack; and tracing a next-most critical input edge of the prioritized listing, subsequent to tracing a complete path from an end point to a source point.

A second aspect of the present disclosure provides a program product stored on a computer readable storage medium, the program product operative to prioritize path tracing in a statistical timing analysis of an integrated circuit when executed, the computer readable storage medium including program code for: determining a required arrival time for a merge point in a statistical timing graph, the merge point having a plurality of associated input edges; calculating a plurality of edge slack distributions for each of the plurality of input edges, each of the plurality of edge slack distributions being a difference between a block-based propagated statistical arrival time through a corresponding one of the plurality of input edges, and the required arrival time at the merge point; projecting a representative edge slack from each of the plurality of edge slack distributions; identifying a most critical input edge based on the plurality of representative edge slacks; generating a prioritized listing of input edges from lowest-value representative edge slack to highest-value representative edge slack; and tracing a next-most critical input edge of the prioritized listing, subsequent to tracing a complete path from an end point to a source point.

A third aspect of the present disclosure provides a system for prioritizing path tracing in a statistical timing analysis of an integrated circuit, the system comprising: a computing device configured to receive a statistical timing graph input, and including logic for: determining a required arrival time for a merge point in a statistical timing graph, the merge point having a plurality of associated input edges; calculating a plurality of edge slack distributions for each of the plurality of input edges, each of the plurality of edge slack distributions being a difference between a block-based propagated statistical arrival time through a corresponding one of the plurality of input edges, and the required arrival time at the merge point; projecting a representative edge slack from each of the plurality of edge slack distributions; identifying a most critical input edge based on the plurality of representative edge slacks; generating a prioritized listing of input edges from lowest-value representative edge slack to highest-value representative edge slack; and tracing a next-most critical input edges of the prioritized listing, subsequent to tracing a next-most critical input edge of the prioritized listing.

BRIEF DESCRIPTION OF THE DRAWINGS

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings, and it is to be understood that other embodiments may be used and that changes may be made without departing from the scope of the present teachings. The following description is, therefore, merely illustrative.

INTRODUCTION AND GENERAL DEFINITIONS

Critical path tracing is a fundamental operation in static timing analysis of an integrated circuit (IC) to provide functions such as reporting, common path pessimism removal (CPPR), etc. Path tracing conventionally includes a backwards traversal of the timing graph, e.g., beginning at an end point of the timing graph and tracing back to one or more signal sources. In the event that a timing graph includes, e.g., one or more points at which incoming inputs merge before continuing to a given end point, the tracing of critical paths must include a determination of which input branch to follow backwards from a merge point. Where two or more paths are available, it may be desired to follow a path with the greatest effect on timing requirements (e.g., the most critical path), before tracing paths with a smaller effect on timing requirements (e.g., less critical paths). In some proposed integrated circuit (IC) layouts, operational process variations can complicate the determining of critical paths because the criticality of particular inputs to a merge point can vary based on seemingly unpredictable process factors.

To improve the quality of path tracing in statistical timing analysis, embodiments of the present disclosure provide a process methodology for prioritized path tracing in STA of an IC. More specifically, the concept of prioritized path tracing involves evaluating the timing of different inputs to a merge point as representative scalar quantities, identifying a most critical input edge, and ranking the remaining input edges in order of greatest criticality to lowest criticality. Processes according to the present disclosure can include starting at a test end point and tracing a path backwards until reaching a merge point, which is associated with a plurality of input edges. A required arrival time (RAT) for the merge point can be determined by taking RAT at given end point and subtracting a cumulative delay from the merge point to the end point. Processes of the present disclosure can then include calculating an "edge slack distribution" for each of the plurality of input edges to the merge point.

As is discussed herein, "edge slack" refers to a difference between the statistical arrival time to the merge point from an input edge, and the RAT at the merge point. In a statistical timing analysis paradigm, edge slack can be represented as a probability distribution instead of a deterministic number, and therefore can be described as an "edge slack distribution." Embodiments of the present disclosure can then project a representative value of edge slack from each of the calculated edge slack distributions. A prioritized listing of the inputs to the merge point can be generated by ranking of each of the representative values of edge slack from lowest-value edge slack (i.e., greatest effect on meeting or not meeting RAT) to highest-value edge slack (i.e., lowest effect on meeting or not meeting RAT). Path tracing can then continue from the merge point, e.g., by consecutively tracing each of the plurality of inputs to the merge point in the order of the prioritized listing.

Figure 1:
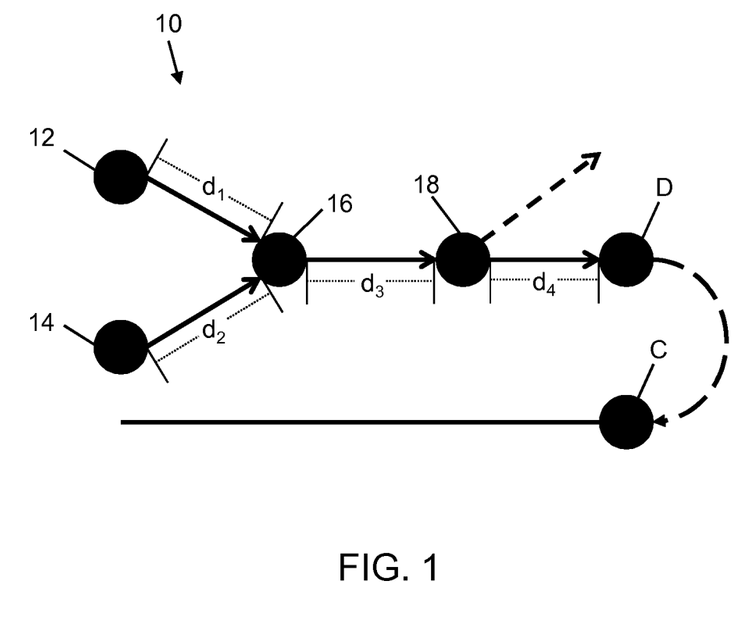
FIG. 1 is a simplified schematic diagram of a statistical timing graph with data and clock paths according to embodiments of the present disclosure.

Referring to FIG. 1, an example statistical timing graph (STG) 10 for modeling an IC in block-based deterministic static timing analysis is shown. STG 10 depicted in FIG. 1 is used for the purposes of demonstration and example only, and it is understood that STGs of varying size and complexity can be used in embodiments of the present disclosure by application of the same concepts discussed herein and as applied relative to FIG. 1. The various nodes 12, 14, 16, 18, C, and D each can represent pins of gates and wires. Node C can represent a "clock pin" or designated end point of a clock network, while node D can represent a "data pin" or designated end point of a data network. For the modeled IC to be considered a "pass" in timing analysis, a signal propagated from a source point (e.g., nodes 12 or 14 in FIG. 1) must reach end point D before, or at the same time as, a clock signal traveling to node C. The amount of time required to satisfy this condition can be identified as RAT, and a difference between a signal's modeled arrival time at D and RAT for the same point can be known as "slack." Edges between each node, represented with arrows in FIG. 1, can represent pin-to-pin transitions. Each edge can have an associated delay ("$d_1$," "$d_2$," "$d_3$," and "$d_4$" in FIG. 1) corresponding to the amount of time needed for signals to travel from one node to another.

The clock and data networks of a timing graph need to be modeled and timed. To run a timing analysis using the timing graph, early and late arrival times at end point D can be determined by starting with an asserted arrival time at each primary input (PI), e.g., nodes 12 and 14, and adding the delay across each edge from a given PI to a given end point. At a merge point (e.g., node 16) with several inputs, the process can be simplified by forward-propagating only the maximum of the incoming late arrival times and a minimum of the incoming early arrival times. The various propagated arrival times can be used for several timing tests. For instance, setup and hold tests for memory elements such as flip-flops can define RATs for node C and node D.

The RATs are backward-propagated in the timing graph starting with asserted RATs at primary outputs (POs) and end points of tests and subtracting delays on edges encountered. At a merge point (e.g. node 18 in FIG. 1) the RAT back-propagated from node D (after subtracting delay $d_4$) merges with another RAT back-propagated (shown in phantom), e.g., from a PO. For late mode, the RAT at node 18 is the minimum of the two RATs while for early mode, it is the maximum of the two RATs. Mathematically, slack can be defined by the general formula:

Slack=*AT-RAT*, for early mode,

Slack=*RAT-AT*, for late mode.

Positive slack value means the signal met expectations (which is good from a timing point of view), while negative slack indicates a timing failure. Regardless, these deterministic models can be directly adapted and used for a block-based statistical static timing analysis (SSTA). SSTA generally models timing qualities (e.g., delay, AT, RAT, slacks, slews, transition times, setup and hold times, etc.) as probability distributions expressible with vectors rather than as variables with scalar values. In SSTA, the value of any timing quality (e.g., arrival time, RAT, slack, slew, etc., represented generally as "T") can be expressed in linear form as:

$$T = T_0 + \sum_{i=1}^{N} a_i X_i + a_R R,$$

with $X_i$ and R representing normalized Gaussian random variables (each having a mean of zero), $X_i$ modeling globally correlated variations of process parameters and R modeling uncorrelated (or random) variations, $T_0$ representing a mean value of the timing quantity, $a_i$ and $a_R$ each representing sensitivities to the corresponding variations, and N representing the number of globally correlated sources of variation. Using this generalized form, each mathematical operation on a deterministic timing quantity (including addition, subtraction, minimum determination, and maximum determination) can be applied to an SSTA model. As used herein, the term "projection" or "projecting" refers to a mathematical operation in which a representative scalar value of a timing quantity, within the domain of real numbers, is extracted from a distribution representation in the canonical (i.e., statistical linear) form.

Computer System and Example Components

Figure 2:
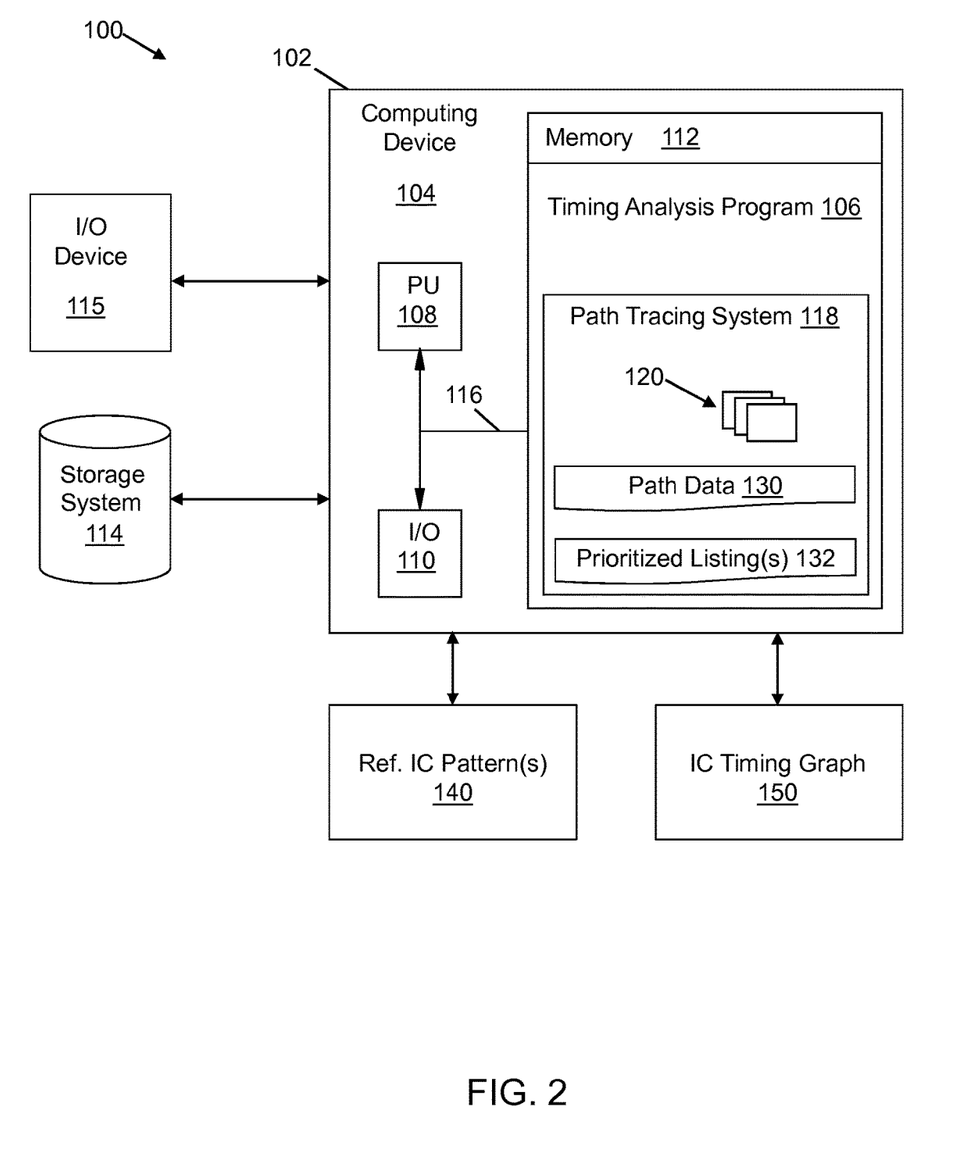
FIG. 2 depicts an illustrative environment which includes a computer system interacting with a reference IC pattern and statistical timing graph according to embodiments of the present disclosure.

Turning now to FIG. 2, an illustrative environment 100 for implementing the methods and/or systems described herein is shown. In particular, a computer system 102 is shown as including a computing device 104. Computing device 104 can include a timing analysis program 106 for performing a timing analysis of a timing graph for one or more IC patterns, and more particularly for prioritized path tracing during analysis of a timing graph, by performing any/all of the processes described herein and implementing any/all of the embodiments described herein.

Computer system 102 is shown including a processing unit 108 (e.g., one or more processors), an I/O component 110, a memory 112 (e.g., a storage hierarchy), an external storage system 114, an input/output (I/O) device 115 (e.g., one or more I/O interfaces and/or devices), and a communications pathway 116. In general, processing unit 108 can execute program code, such as timing analysis program 106, which is at least partially fixed in memory 112. While executing program code, processing unit 108 can process data, which can result in reading and/or writing transformed data from/to memory 112 and/or I/O device 115. Pathway 116 provides a communications link between each of the components in environment 100. I/O component 110 can comprise one or more human I/O devices, which enable a human user to interact with computer system 102 and/or one or more communications devices to enable a system user to communicate with the computer system 102 using any type of communications link. To this extent, timing analysis program 106 can manage a set of interfaces (e.g., graphical user interface(s), application program interface(s), etc.) that enable system users to interact with timing analysis program 106 and/or a path tracing system 118 included therein. Further, timing analysis program 106 can manage (e.g., store, retrieve, create, manipulate, organize, present, etc.) data, through several modules 120 contained within path tracing system 118.

Further, timing analysis program 106 can include a path tracing system 118. In this case, various modules 120 of path tracing system 118 can enable computer system 102 to perform a set of tasks used by timing analysis program 106, and can be separately developed and/or implemented apart from other portions of timing analysis program 106. Timing analysis program 106 can also include path data 130 and one or more prioritized listings 132 (i.e., each being a prioritized listing of next-most critical input edges) stored therewith. Computer system 102 can be operably connected to one or more reference IC pattern(s) 140, e.g., in the form of a mathematical or physical model, upon which a timing analysis can be performed. Timing analysis program 106 can also generate an IC timing graph 150 from reference IC pattern(s) 140, using, e.g., processes known in the art. STG 10 (FIG. 1) is provided as one example of IC timing graphs 150 suitable for use in embodiments of the present disclosure. IC timing graph 150 may also be predetermined and submitted to computer system 102, e.g., by using any currently known or later-developed electronically readable storage medium. Although IC timing graph 150 is shown by example in FIG. 2 as being external to computing device 104 and timing analysis program 106, it is understood that IC timing graph 150 can also be encoded and/or represented as data within memory 112 in some embodiments. Path tracing system 118 can perform processes discussed herein to yield a prioritized path tracing in a statistical analysis of IC timing graph 150 for modeling reference IC pattern(s) 140. Process steps for prioritizing a group of paths to be traced are discussed in detail elsewhere herein.

Memory 112 can include various software modules 120 configured to perform different actions. Example modules can include, e.g., a comparator, a calculator, a path sorting or tracing module, a determinator, etc. One or more modules 120 can use algorithm-based calculations, look up tables, software code, and/or similar tools stored in memory 112 for processing, analyzing, and operating on data to perform their respective functions. Each module discussed herein can obtain and/or operate on data from exterior components, units, systems, etc., or from memory 112 of computing device 104. Path tracing system 118 of timing analysis program 106 can generate and/or modify path data 130 to create prioritized listing 132 of paths for timing analysis according to embodiments discussed herein.

Where computer system 102 comprises multiple computing devices, each computing device may have only a portion of timing analysis program 106 and/or path tracing system 118 fixed thereon (e.g., one or more modules 120). However, it is understood that computer system 102 and timing analysis program 106 are only representative of various possible equivalent computer systems that may perform a process described herein. Computer system 102 can obtain or provide data, such as data stored in memory 112 or storage system 114, using any solution. For example, computer system 102 can generate and/or be used to generate data from one or more data stores, receive data from another system, send data to another system, etc.

Operational Methodology

Figure 3:
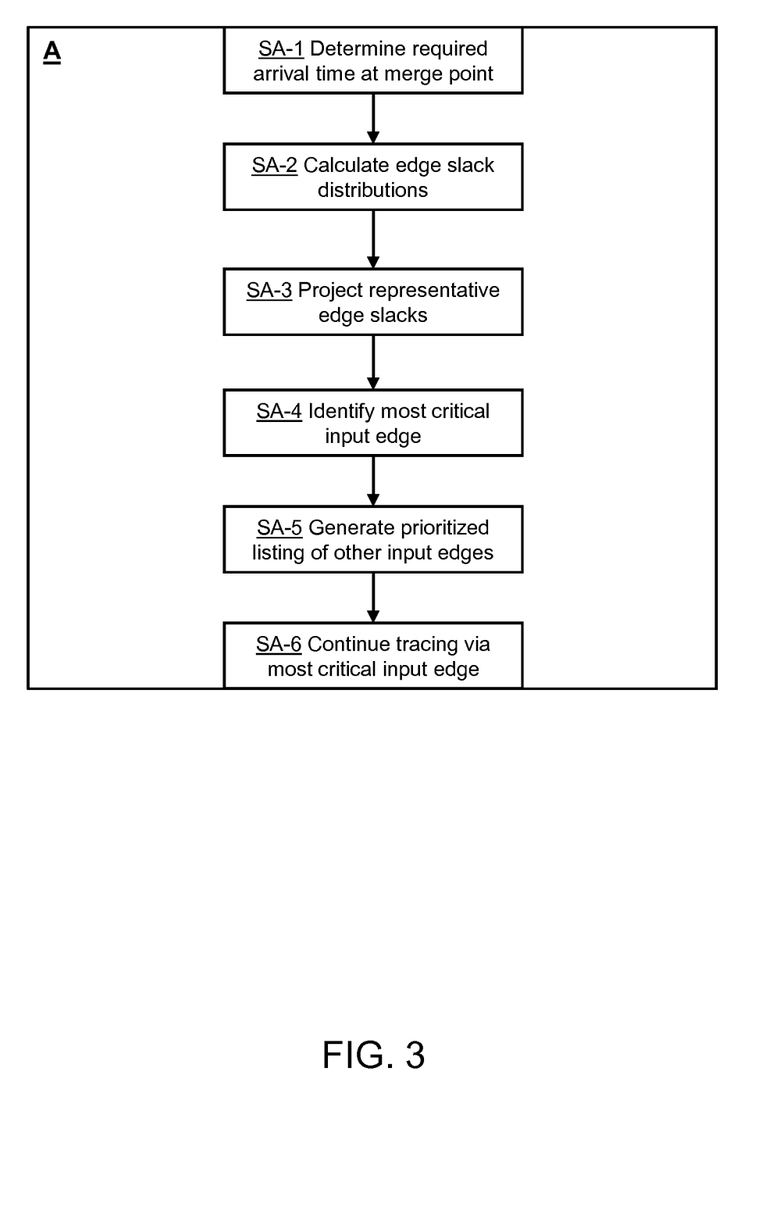
FIG. 3 depicts illustrative method steps for generating a prioritized listing of input edges according to embodiments of the present disclosure.

Referring to FIGS. 1-3 together, a process flow A for tracing a path and generating prioritized listing 132 of input edges to trace future paths according to embodiments of the present disclosure is described. The illustrative timing graph of FIG. 1 provides an example of IC timing graph 150 for statistical analysis of an IC as described herein. As is discussed elsewhere herein (e.g., by reference to FIG. 5), process flow A can be implemented as part of a larger, more generalized process flow for carrying out embodiments of the present disclosure.

Embodiments of the present disclosure can provide a methodology by which an edge slack is first computed for each input edge associated with a given merge point. This computation can use a required arrival time (RAT) at the merge point back-propagated from the given test end point and a propagated-arrival time (AT) through the edge. Modules 120 at step SA-1 can determine a required arrival time (RAT) at a given merge point based on tracing a path backward from a given test end point to the given merge point in IC timing graph 150. Using FIG. 1 as an example, modules 120 in step SA-1 can select data node D as a test end point and determine a total delay (e.g., $d_3+d_4$) expressed as a statistically modeled delay in canonical form between the given merge point (e.g., nodes 16 and D in STG 10). Modules 120 can subtract this expression of delay from the RAT at D, which can also be expressed in statistical canonical form to compute the RAT at merge point node 16. The propagated-AT through an edge is simply the block-based AT on the input node of the edge in statistical canonical form added to the delay on the edge which is also in statistical canonical form.

Prioritized path tracing for a group of input edges to a merge point can include modeling an edge slack for each of the input edges. At step SA-2 modules 120 can calculate an edge slack distribution (i.e., an expression of slack for each edge, in canonical statistical form). The edge slack for each input edge can generally be expressed as a difference between the canonical RAT determined in step SA-1 and a block-based propagated statistical AT through the input of the edge expressed in canonical form, i.e., pursuant to the statistical models described elsewhere herein. Thus, modules 120 with calculating functions can yield a group of edge slack distributions in step SA-2, each of which can correspond to a particular input edge and can be modeled in statistical canonical form. Referring to the example in FIG. 1, modules 120 can calculate two edge slack distributions: one edge slack distribution corresponding to the input edge between nodes 12 and 16, and another edge slack distribution corresponding to the input edge between nodes 14 and 16. The propagated-AT through the first edge, e.g., between nodes 12 and 16 in STG 10, is computed by taking the block-based statistical AT on node 12 (the input of the edge) and adding to it the canonical delay of the edge $d_1$. In the example of STG 10, the edge slack for one edge is then expressed as the difference between the RAT at node 16 and the sum of AT on node 12 plus $d_1$. Similarly, the propagated-AT through another edge between nodes 14 and 16 is computed by taking the block-based statistical AT on node 14 (the input of the edge) and adding to it the canonical delay of the edge $d_2$. So, the edge slack for this edge is simply the difference between the RAT at node 16 and the sum of AT on node 14 and $d_2$. If STG 10 were modified such that node 16 included, e.g., five input edges, modules 120 would calculate five edge slack distributions, with each corresponding to one of the five input edges.

After calculating an edge slack distribution for each input edge, the flow can proceed to step SA-3 in which modules 120 mathematically project a representative edge slack for each of the input edges to the merge point. Mathematically projecting a value of edge slack can include any currently known or later developed process of converting a statistical quantity (e.g., an edge slack distribution of an input edge, in canonical form) into a scalar quantity (e.g., a single real number) which provides a representative value within the distribution. Earlier steps of the process flow can yield a calculated value of edge slack for each input edge, expressed in a statistical canonical form, e.g., $$(\text{Edge Slack}_a) = RAT_b - (AT_a + d_a) [\text{assuming late mode}]$$

where subscript "a" represents a given input node, subscript "b" represents a merge point, $RAT_b$ represents a required arrival time at the designated merge point "b," $AT_a$ represents a calculated arrival time at a designated node "a," and $d_a$ represents a delay along the corresponding input edge leading from node a to node b. This linear expression of edge slack can also be expressed as, e.g., a vector format expression including a statistical "mean" of edge slack and "sensitivities." Although edge slack can be modeled as any conceivable type of statistical distribution, an example distribution discussed herein can include a Gaussian distribution (known colloquially as a bell curve). Pursuant to a mathematical approximation known as the "empirical rule," approximately 99.73% of the area beneath a Gaussian distribution curve is included within the boundaries of the mean plus or minus three times the standard deviation of the distribution. To model a Gaussian distribution made up of multiple distributions, the standard deviation of the final distribution can be modeled using the sum of the squares of the standard deviation for each individual distribution. Pursuant to this example technique, a "maximum" projected value of the distribution can be expressed as the mean plus three times the RSS of each sensitivity, while a "minimum" projected value of the distribution can be expressed as the mean minus three times the RSS of each sensitivity. In embodiments of the present disclosure, the criticality of an input edge can be inversely proportional to the amount of slack along the input edge and directly proportional to the amount of negative slack along the input edge. As a result, an illustrative projection of each edge slack distribution can be set to the mean of the distribution minus three times the RSS of each sensitivity (i.e., corresponding to mean minus three times the standard deviation of a simple Gaussian distribution). However, it is understood that any other technique or combination of techniques for generating a representative value from a distribution (Gaussian or otherwise) can also be executed in step SA-3.

To better illustrate the process of projecting a representative edge slack in step SA-3, an example is provided by reference to FIG. 1. Where scalar values from edge slack distributions for two input edges to a merge point of STG 10 at node 16 are being projected, one can assume each edge slack distribution as being substantially Gaussian. In this example implementation, an edge slack distribution calculated between nodes 12 and 16 in canonical form can be expressed as:

$$(\text{Edge Slack}_1) = 10.523 - 3.6V - 2.7T,$$

where 10.523 is the mean edge slack (an "early" mean), V represents voltage and T represents temperature; both V and T being Gaussian distributions. In addition, an edge slack distribution calculated between nodes 14 and 16 in canonical form can be:

$$(\text{Edge Slack}_2) = -0.477 - 0V - 0T,$$

where −0.477 is the mean edge slack (a "late" mean), and the calculated temperature and voltage sensitivities (coefficients to voltage and temperature) have been calculated to be zero. Applying the Gaussian projection formulas described herein, a minimum projection value for the input edge between nodes 12 and 16 can be −2.977 and a minimum projection value for the input edge between nodes 14 and 16 can be −0.477. Note that, in this example, the representative value (as a statistical minimum projection) of the edge slack distribution between nodes 12 and 16 (i.e., −2.977) is a negative value (i.e., late), even though the mean value for this edge slack was a positive value (i.e., early) of 10.523. Here, the representative edge slack for the input edge between nodes 12 and 16 is determined to be lower than the representative edge slack between the input edge between nodes 14 and 16 (i.e., −0.477).

At step SA-4, modules 120 with determining functions can identify a most critical input edge to the merge point using the representative edge slacks projected in step SA-3. As used herein, the term "critical" or "criticality" refers to the degree to which timing along a particular input edge affects whether reference IC pattern 140 complies with timing requirements. As such, input edges with the least amount of edge slack are the most critical input edges because they are more likely to cause a timing violation during operation. As discussed elsewhere herein, the most critical input edge to a merge point can be traced regardless of whether its associated slack is, e.g., positive, negative, significant, etc. However, a user and/or implementation of the present disclosure may wish to return to one or more merge points to trace other critical input edges.

To record and prioritize the other, less critical input edges, the flow can proceed to step SA-5 of generating prioritized listing 132 of the other input edges, i.e., all input edges besides the most critical input edge. The other representative edge slacks for each input edge, together, can provide a representative listing of real number projections of edge slacks, each measuring the criticality of a particular input edge to merge point 16. At step SA-4, modules 120 with data organizing functions can generate prioritized listing 132 of the other input edges by ranking each input edge from lowest-value projected edge slack (i.e., the next-most critical input edge) to highest-value projected edge slack (least critical input edge). In other words, prioritized listing 132 of input edges can include a next-most critical input edge to the merge point, followed by a third-most critical input edge to the merge point, following by a fourth-most critical input edge to the merge point, etc., ending with a least-most critical input edge to the merge point and/or one or more designated non-critical edges as discussed herein. In an example embodiment, five input edges to a merge point, other than a most critical input edge, can have projected edge slacks of, e.g., −10, −1, 0, 2, and 7. Here, the input edge with and edge slack of −10 would be designated the next-most critical input edge, while the prioritized list would order the remaining input edges from −1 (third-most critical) followed by 0, 2, and 7 (least critical). In general, several input edges to a merge point (e.g., node 16) can be prioritized according to this paradigm because a larger timing violation along one input edge can indicate that timing errors along that edge will have more substantial consequences during operation of an IC with STG 10. In addition, where the amount of time available for finding and correcting timing violations in STG 10 is limited, input edges with greater effects on IC performance can be analyzed and/or corrected before others, and before the time and/or cost of testing is exceeded. An edge being included in prioritized listing 132 of input edges (generated in step SA-5) can serve as a flag for later testing. However, the order of prioritized listing 132 can permit more critical edges to be analyzed before less critical edges (i.e., paths with greater effects on timing evaluated first). In the Example of FIG. 1, the input edge from node 12 to 16 can have a representative edge slack of approximately −2.977, while the input edge from node 14 to 16 can have a representative edge slack of approximately −0.477. Here, the input edge from node 12 to 16 has a lower edge slack than the input edge from node 14 to 16, and therefore would be traced first. However, embodiments of the present disclosure would also add the input edge from node 12 to 16 to a prioritized listing of input edges, such that the other input edge (i.e., next-most critical input edge) can be traced later.

At step SA-6, timing analysis of STG 10 can continue to backwards-trace IC timing graph 150 along the most critical edge identified in step SA-4. Specifically, backwards tracing of STG 10 can continue tracing from the analyzed merge point (e.g., node 16 in STG 10) along the highest-priority (i.e., most critical) input edge, with other critical edges to the merge point being flagged for future tracing. Modules 120 with path tracing functions can continue backwards from the merge point until reaching a particular source point, or a preceding merge point. Where the critical input edge leads to another merge point, embodiments of process flow A can be repeated successively as is discussed elsewhere herein (e.g., by reference to FIG. 5). Where the critical input edge leads to a source point in STG 10, modules 120 with path tracing functions can return to another node (e.g., node 16 in STG 10), to trace the next-most critical input edge using the previously-generated prioritized listing.

Figure 4:
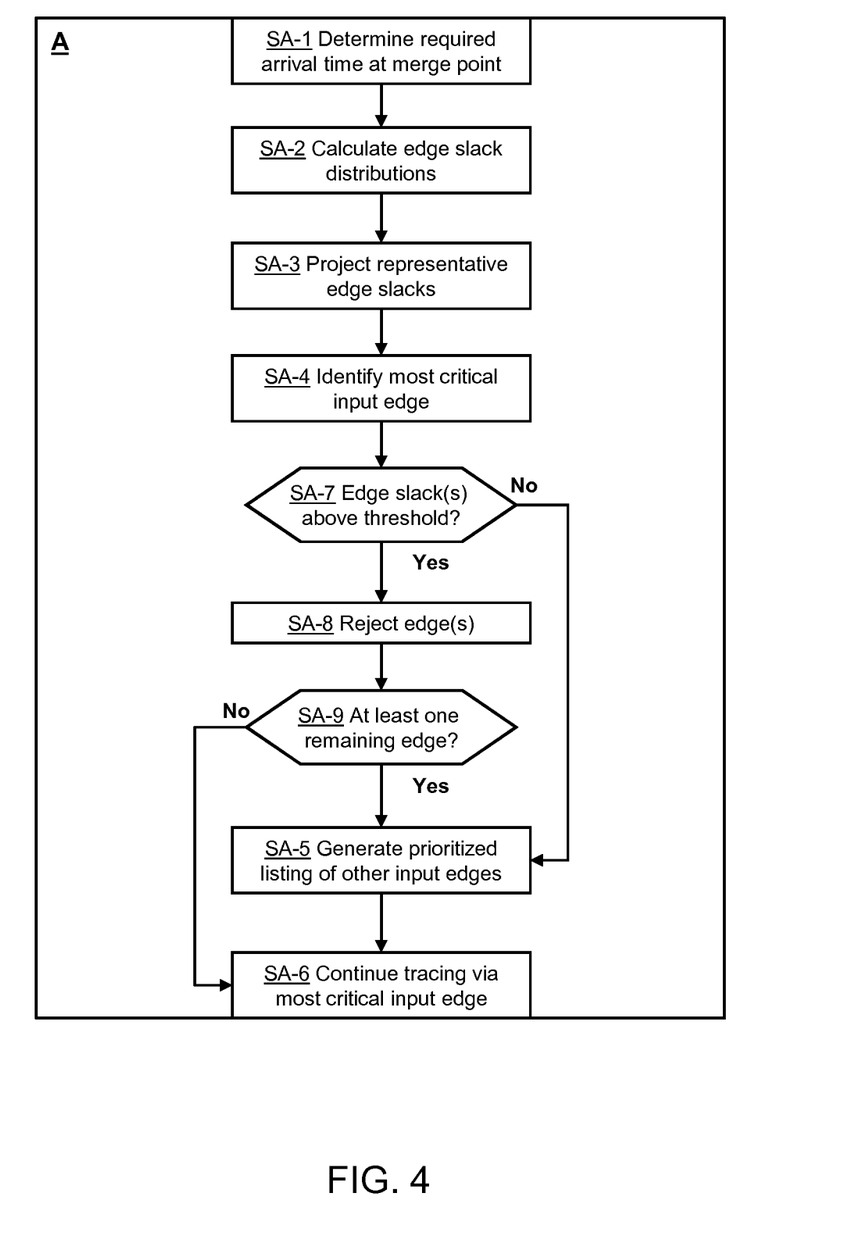
FIG. 4 depicts an alternative group of method steps for generating a prioritized listing of input edges according to embodiments of the present disclosure.

Referring now to FIGS. 1, 2, and 4, an alternative embodiment of process flow A is shown. Process flow A can optionally include additional steps SA-7 through SA-9 for simplifying IC timing graphs 150 to remove input edges with insignificant effects on whether reference IC pattern 140 complies with timing requirements. In cases where none of the input edges to a merge point are critical, the flow can bypass the generating of a prioritized listing of input edges in step SA-5 altogether. The additional, optional steps shown in FIG. 4 and discussed herein can occur after identifying a most critical input edge in step SA-4, and before timing analysis program 106 generates a prioritized listing of input edges in step SA-5 and/or continues tracing via the most critical input edge in step SA-6. Although the determinations in steps SA-7 through step SA-9 are shown by example as being performed in a sequential order, it is also understood that their order may be modified to suit a particular embodiment. Regardless of the chosen implementation, steps SA-7 through SA-9 can provide a methodology for simplifying the analysis of IC timing graph(s) 150.

At step SA-7, modules 120 with determining functions can determine whether one or more of the representative edge slacks of a corresponding input edge, including the most critical input edge in step SA-4, are greater than a predetermined threshold. For example, where some input edges would arrive "early" at a particular merge point (e.g., node 16 of STG 10), the representative edge slack(s) for the input edge would be greater than zero. In an example embodiment, a threshold value of edge slack can be approximately zero, such that some input edges can optionally be disregarded where signals arriving at a merge point would arrive early. It is also understood that any number of edge slack thresholds can be applied in step SA-7. Where none of the representative edge slacks projected in step SA-3 are greater than the edge slack threshold (i.e., "no" at step SA-7), the flow can proceed to step SA-5 of generating a prioritized listing of each input edge to a merge point, other than the most critical edge identified in step SA-4. Where at least one representative edge slack projected in step SA-3 is greater than the edge slack threshold (i.e., "yes" at step SA-7), the flow can later proceed to steps SA-8 and SA-9, described elsewhere herein, for defining and/or excluding these input edges from prioritized listing 132 as being non-critical.

In the event that none of the input edges to the merge point exceed the threshold (i.e., "no" at step SA-7), the flow can proceed to step SA-5 of generating a prioritized listing of other input edges as described elsewhere herein. Where a threshold in step SA-7 is exceeded (i.e., "yes" at step SA-7), modules 120 can reject one or more input edges to the merge point (e.g., node 16 in STG 10) as being non-critical in step SA-8. A "non-critical" input edge, as used herein, need not be limited to an input edge with zero or positive slack, but can refer to any input edge with a representative edge slack above a threshold amount. Thus, modules 120 with path organization functions can mark-off non-critical paths in step SA-8 to exclude them from future tracing in response to finding that their edge slack exceeds the threshold applied in step SA-7.

It is also understood that process flow A can accommodate merge points in which each input edge, including the most critical input edge identified in step SA-4, exceeds the edge slack threshold applied in step SA-7. At step SA-9, modules 120 with determining functions can determine whether at least one input edge to the merge point is remaining (i.e., not rejected in step SA-8). For instance, it is possible for each edge slack other than the most critical input edge identified in step SA-4 to be rejected as non-critical during step SA-8. In this situation (i.e., "no" at step SA-9), the flow can immediately proceed to continue tracing via the most critical input edge in step SA-6, without generating a prioritized listing of input edges in step SA-5. However, where one or more input edges to the merge point have not been rejected in step SA-8 (i.e., "yes" at step SA-9), the flow can proceed to step SA-4 of generating a prioritized listing of input edges to the merge point other than the most critical input edge.

Figure 5:
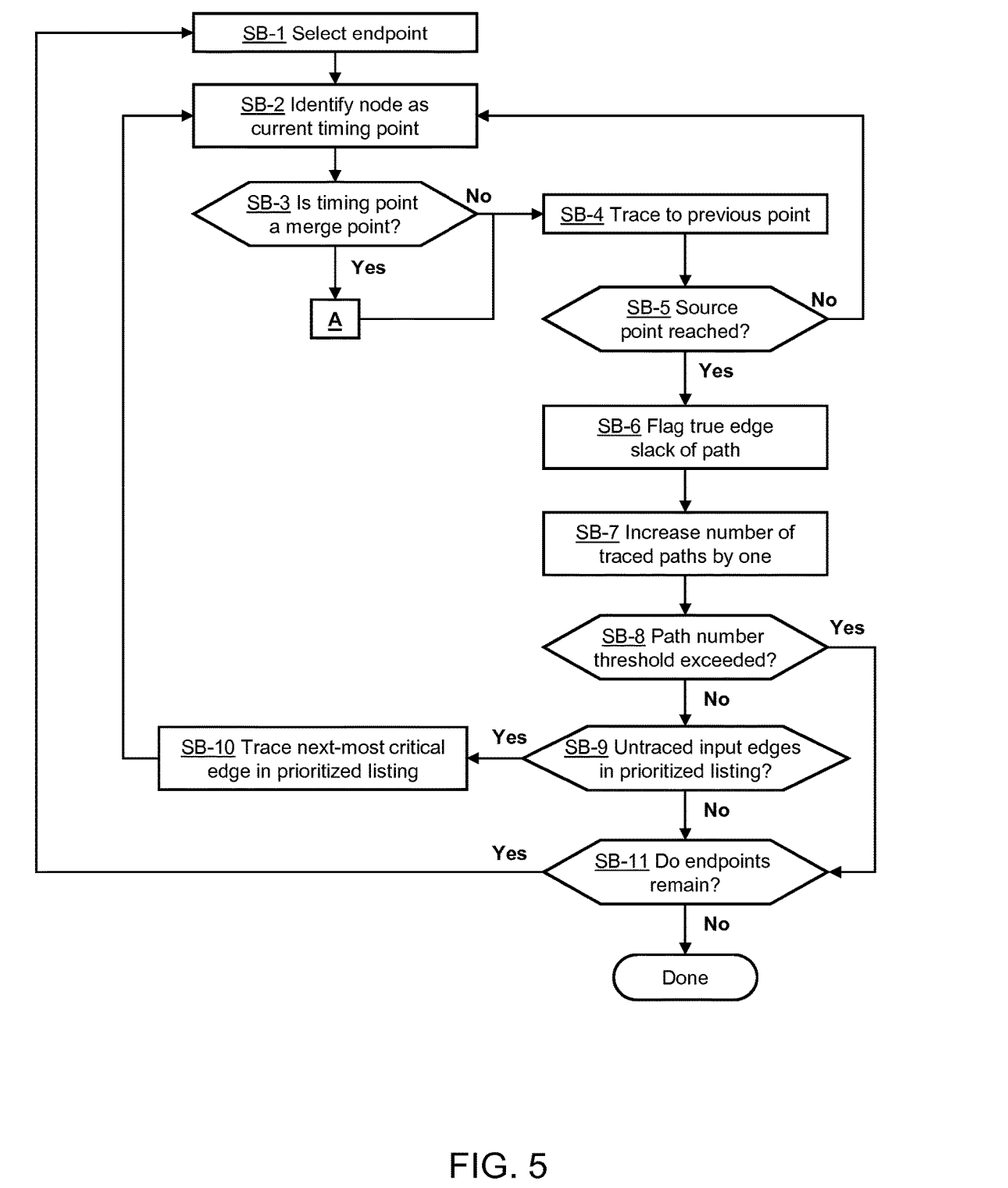
FIG. 5 depicts an example processing methodology in which input edges to one or more merge points are prioritized and traced according to embodiments of the present disclosure.

Referring to FIGS. 1, 2, and 5, process flows according to the present disclosure which include steps SA-1 through SA-6 (and optionally steps SA-7 through SA-9) in process flow A are described in further detail. Embodiments of the process flow in FIG. 5, which can incorporate embodiments of process flow A, can provide a complete timing analysis paradigm for IC timing graphs 150 (e.g., STG 10) and a methodology for automatically generating and using multiple prioritized listings of input edges to merge points. At step SB-1, an end point in IC timing graph 150 (e.g., data node D of STG 10) can be selected manually by a user or automatically using a path tracing module of modules 120. As defined elsewhere herein, end point can generally refer to a final node in IC timing graph 150, at which a signal has completely propagated through an IC fabricated from reference IC pattern(s) 140, a node where a timing check or test (i.e., Setup/Hold/Pulse-width) is performed, and/or any other node in IC timing graph 150 which is manually or automatically defined as being an end point. Where IC timing graph 150 includes multiple end points, modules 120 can automatically select one end point based on an independent processing methodology for selecting end points, inputs from a user, and/or any other currently known or later-developed technique for organizing the analysis of IC timing graph 150. It is also understood that embodiments of the process flow shown in FIG. 4 can be executed substantially simultaneously by a single timing analysis program 106, such that multiple end points are selected simultaneously or perform a timing analysis of multiple IC timing graphs 150 or different areas of a single IC timing graph.

Proceeding to step SB-2, modules 120, modules 120 with path tracing functions can identify the current timing point (whether an end point at the outset of timing analysis or another point in IC timing graph 150 in later stages of timing analysis) as being a "current timing point." To determine whether embodiments of process flow A can be implemented at the current timing point, the flow can proceed to a step SB-3 in which modules 120 can determine whether the current timing point (identified in step SB-2) constitutes a merge point. A merge point can generally be defined as a point within IC timing graph 150 where multiple input edges converge before proceeding toward the end point selected in SB-1. Where modules 120 determine the current timing point as being a merge point (i.e., "yes") at step SB-3, the flow can proceed to embodiments of process flow A, examples of which are discussed elsewhere herein. Where the current timing point is determined to not be a merge point and/or following the completion of process flow A, the flow can proceed to step SB-4, where modules 120 with path tracing functions can backwards trace IC timing graph 150 from the current timing point to a previous point, i.e., the input of the critical edge to a merge point or the single edge to the current timing point in the event that the current timing point is not a merge point.

After tracing IC timing graph 150 to a previous point in step SB-4, modules 120 can determine whether the previous point constitutes a source point of IC timing graph 150. As used herein, the term "source point" can include, e.g., a point with no input edges leading thereto or any other point defined manually or automatically to be a point where path tracing stops, e.g., an internal point in the timing graph where the AT is asserted). Where additional input edges can be traced from the current point (i.e., "no" at step SB-5), the flow can return to step SB-2 of identifying the node as a current timing point. Where the flow returns to step SB-2 after identifying and tracing a critical input edge from a prioritized listing of input edges (i.e., after executing process flow A), process flow A can repeat at a preceding merge point substantially by repeating the deriving, calculating and projecting steps therein. The repeated execution of process flow A can thereby add additional input edges to the same prioritized listing, each of which may be of greater or lesser criticality than other input edges to a later merge point in IC timing graph 150. Where modules 120 determine the previous node as being a source point (i.e., "yes" at step SB-5), the flow can proceed to step SB-6 in which modules 120 can flag (e.g., record or earmark for future processing) the edge slack distribution along the traced path (i.e., from the source point to the selected end point) as being a true statistical representation (in canonical form) of slack along the traced path, regardless of projections used to prioritize each alternative input edge to merge points therein.

In some implementations, it may be desirable to limit the total number of paths traced from a given end point. To provide this constraint, the flow can optionally include steps SB-7 and/or SB-8 to track and limit the total number of paths traced from the end point selected in step SB-1. At SB-8, modules 120 with counting or calculating functions can increase a number of traced paths by one. Thereafter, the flow can proceed to step SB-8 in which modules 120 with determining functions can determine whether a predetermined path number threshold is exceeded. For example, a timing analysis of reference IC pattern 140 can include a threshold number of paths to be traced from a given end point (also known as a path budget) set by processing characteristics, e.g., of computer system 102. Since embodiments of the present disclosure can allow input edges with greater criticality (e.g., lower amounts of positive slack or greater amounts of negative slack) to be traced before other input edges, timing analysis program 106 can include a manually or automatically defined number of paths to be traced for analysis of IC timing graph 150 from the end point selected in step SB-1. Where the number of previously traced paths is greater than a threshold amount (i.e., "yes" at step SB-8), the flow can proceed to steps for determining whether other end points can be selected and used for tracing, discussed in further detail elsewhere herein. Where the path number increased in step SB-7 does not exceed the path number threshold (i.e., "no" at step SB-8), the flow can proceed to further steps for backward-tracing additional paths from the previously selected end point.

At step SB-9 modules 120 can determine whether other input edges included in prioritized listing 132 have not been traced and analyzed. Where at least one input edge within prioritized listing 132 has not been traced and analyzed, (i.e., "yes" at step SB-9), the flow can proceed to a step SB-10 in which modules 120 with path tracing functions move to a previous merge point in IC timing graph 150 to trace the next-most critical input edge in prioritized listing 132. Subsequently, the flow can proceed to step SB-2 in which this node is identified as the current timing point and further tracing of paths can continue. Where each input edge in prioritized listing 132 has been previously tested (i.e., "yes" at step SB-9), the flow can proceed to step SB-11, in which modules 120 with determining functions can determine whether at least one end point in IC timing graph 150 has not been tested. Where no other end points remain for tracing (i.e., "no" at step SB-11), the flow can terminate ("Done"). Where at least one end point has not been used for tracing and timing analysis, the flow can instead return to step SB-1 for further tracing and timing analysis of IC timing graph 150.

Alternative Embodiments and Implementations

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As used herein, the term "configured," "configured to" and/or "configured for" can refer to specific-purpose features of the component so described. For example, a system or device configured to perform a function can include a computer system or computing device programmed or otherwise modified to perform that specific function. In other cases, program code stored on a computer-readable medium (e.g., storage medium), can be configured to cause at least one computing device to perform functions when that program code is executed on that computing device. In these cases, the arrangement of the program code triggers specific functions in the computing device upon execution. In other examples, a device configured to interact with and/or act upon other components can be specifically shaped and/or designed to effectively interact with and/or act upon those components. In some such circumstances, the device is configured to interact with another component because at least a portion of its shape complements at least a portion of the shape of that other component. In some circumstances, at least a portion of the device is sized to interact with at least a portion of that other component. The physical relationship (e.g., complementary, size-coincident, etc.) between the device and the other component can aid in performing a function, for example, displacement of one or more of the device or other component, engagement of one or more of the device or other component, etc.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for prioritized path tracing in a statistical timing analysis for fabrication of an integrated circuit, the method comprising:
   determining a required arrival time for a merge point in a statistical timing graph, the merge point having a plurality of associated input edges;
   calculating a plurality of edge slack distributions for each of the plurality of input edges, each of the plurality of edge slack distributions being a difference between a block-based propagated statistical arrival time through a corresponding one of the plurality of input edges, and the required arrival time at the merge point;
   projecting a representative edge slack from each of the plurality of edge slack distributions;
   identifying a most critical input edge based on the plurality of representative edge slacks;
   generating a prioritized listing of input edges from lowest-value representative edge slack to highest-value representative edge slack;
   tracing a next-most critical input edge of the prioritized listing, subsequent to tracing a complete path from an end point to a source point;
   tracing the most critical edge to one of a preceding merge point and the source point;
   in response to reaching a preceding merge point, repeating the determining, calculating, and projecting to add additional input edges to the prioritized listing;
   in response to reaching a source point, terminating the tracing and flagging a total edge slack distribution from the source point to the end point as a true path slack; and
   designing and fabricating an integrated circuit structure based on the results of the tracing and flagging.

2. The method of claim 1, wherein the block-based propagated statistical arrival time further includes a delay along the corresponding input edge added to the block-based statistical arrival time at a node preceding the corresponding input edge.

3. The method of claim 1, further comprising rejecting one of the plurality of input edges as being non-critical based on one of the associated representative edge slack being greater than a threshold value.

4. The method of claim 1, further comprising terminating the tracing in response to exceeding a threshold number of previously traced paths.

5. The method of claim 1, further comprising tracing a path from a selected one of a plurality of end points to the merge point and deriving the required arrival time for the merge point relative to the selected one of the plurality of end points.

6. The method of claim 1, wherein the projecting of the representative edge slack from each of the plurality of edge slack distributions includes selecting a representative operating voltage and a representative operating temperature.

7. A program product stored on a computer readable storage medium, the program product operative to prioritize path tracing in a statistical timing analysis for fabrication of an integrated circuit when executed, the computer readable storage medium comprising program code for:
   determining a required arrival time for a merge point in a statistical timing graph, the merge point having a plurality of associated input edges;
   calculating a plurality of edge slack distributions for each of the plurality of input edges, each of the plurality of edge slack distributions being a difference between a block-based propagated statistical arrival time through a corresponding one of the plurality of input edges, and the required arrival time at the merge point;
   projecting a representative edge slack from each of the plurality of edge slack distributions;
   identifying a most critical input edge based on the plurality of representative edge slacks;
   generating a prioritized listing of input edges from lowest-value representative edge slack to highest-value representative edge slack;
   tracing a next-most critical input edge of the prioritized listing, subsequent to tracing a complete path from an end point to a source point;
   tracing the most critical edge to one of a preceding merge point and the source point;
   in response to reaching a preceding merge point, repeating the determining, calculating, and projecting to add additional input edges to the prioritized listing;
   in response to reaching a source point, terminating the tracing and flagging a total edge slack distribution from the source point to an end point as a true path slack; and
   designing and fabricating an integrated circuit structure based on the results of the tracing and flagging.

8. The program product of claim 7, wherein the block-based propagated statistical arrival time further includes a delay along the corresponding input edge added to the block-based statistical arrival time at a node preceding the corresponding input edge.

9. The program product of claim 7, wherein the computer readable storage medium further comprises program code for rejecting one of the plurality of input edges as being non-critical based on one of the associated representative edge slack being greater than a threshold value.

10. The program product of claim 9, wherein the computer readable storage medium further comprises program code for terminating the tracing in response to exceeding a threshold number of previously traced paths.

11. The program product of claim 7, wherein the computer readable storage medium further comprises program code for tracing a path from a selected one of a plurality of end points to the merge point and deriving the required arrival time for the merge point relative to the selected one of the plurality of end points.

12. The program product of claim 7, wherein the projecting of the representative edge slack from each of the plurality of edge slack distributions includes selecting a representative operating voltage and a representative operating temperature.

13. A system for circuit fabrication with prioritizing path tracing in a statistical timing analysis, the system comprising:
   a computing device configured to receive a statistical timing graph input, and including logic for:
      determining a required arrival time for a merge point in a statistical timing graph, the merge point having a plurality of associated input edges;

calculating a plurality of edge slack distributions for each of the plurality of input edges, each of the plurality of edge slack distributions being a difference between a block-based propagated statistical arrival time through a corresponding one of the plurality of input edges, and the required arrival time at the merge point;

projecting a representative edge slack from each of the plurality of edge slack distributions;

identifying a most critical input edge based on the plurality of representative edge slacks;

generating a prioritized listing of input edges from lowest-value representative edge slack to highest-value representative edge slack;

tracing a next-most critical input edge of the prioritized listing, subsequent to tracing a complete path from an end point to a source point;

tracing one of the plurality of input edges to one of a preceding merge point and a source point;

in response to reaching a preceding merge point, repeating the determining, calculating, and projecting to generate a prioritized sub-listing of input edges to the preceding merge point from lowest-value representative edge slack to highest-value representative edge slack;

in response to reaching a source point, terminating the tracing and flagging a total edge slack distribution from the source point to an end point as a true path slack; and designing and fabricating an integrated circuit structure based on the results of the tracing and flagging.

14. The system of claim 13, wherein the block-based propagated statistical arrival time further includes a delay along the corresponding input edge added to the block-based statistical arrival time at a node preceding the corresponding input edge.

15. The system of claim 13, wherein the computing device further includes logic for rejecting one of the plurality of input edges as being non-critical based on one of the associated representative edge slack being greater than a threshold value.

16. The system of claim 15, wherein the computing device further includes logic for terminating the tracing in response to exceeding a threshold number of previously traced paths.

17. The system of claim 13, wherein the computing device further includes logic for tracing a path from a selected one of a plurality of endpoints to the merge point and deriving the required arrival time for the merge point relative to the selected one of the plurality of endpoints.

* * * * *